United States Patent [19]
Langmantel

[11] Patent Number: 5,259,017
[45] Date of Patent: Nov. 2, 1993

[54] CORDLESS TELEPHONE SYSTEM WITH A PRIVATE AUTOMATIC BRANCH EXCHANGE

[75] Inventor: Ernst Langmantel, Vienna, Austria

[73] Assignee: Siemens Aktiengesellschaft, Munich, Fed. Rep. of Germany

[21] Appl. No.: 768,082

[22] PCT Filed: Apr. 4, 1990

[86] PCT No.: PCT/AT90/00025
§ 371 Date: Nov. 6, 1991
§ 102(e) Date: Nov. 6, 1991

[87] PCT Pub. No.: WO90/12469
PCT Pub. Date: Oct. 18, 1990

[30] Foreign Application Priority Data
Apr. 4, 1989 [AT] Austria .................. A788/89

[51] Int. Cl.$^5$ ................ H04M 11/00; H04M 3/42
[52] U.S. Cl. ............................ 379/58; 379/61; 379/201; 379/210; 379/211; 379/212
[58] Field of Search .............. 379/58, 59, 60, 61, 379/62, 201, 210, 211, 212

[56] References Cited

U.S. PATENT DOCUMENTS

| | | | |
|---|---|---|---|
| 4,879,740 | 11/1989 | Nagashima et al. | 379/60 |
| 4,930,151 | 5/1990 | Walton et al. | 379/211 |
| 5,062,133 | 10/1991 | Melrose | 379/211 |
| 5,142,654 | 8/1992 | Sonberg et al. | 379/60 |

FOREIGN PATENT DOCUMENTS

| | | |
|---|---|---|
| 0180178 | 5/1986 | European Pat. Off. . |
| 0188322 | 7/1986 | European Pat. Off. . |
| 0260763 | 3/1988 | European Pat. Off. . |
| 0291068 | 11/1988 | European Pat. Off. . |
| 58-191540 | 11/1983 | Japan . |
| 2166622 | 5/1986 | United Kingdom . |
| 2193861 | 2/1988 | United Kingdom . |

OTHER PUBLICATIONS

A New Mobile Communication System using Radio Link Control by Hattori et al, 37th IEEE Vehicular Technology Conference, Jun. 1987, pp. 579-586.
A manual A30951-A1000-V220-1-18 of Siemens AG.

Primary Examiner—Curtis Kuntz
Assistant Examiner—Vijay Shankar
Attorney, Agent, or Firm—Hill, Steadman & Simpson

[57] ABSTRACT

Base stations (FSn) of cordless telephones are connected via subscriber lines (TL) to a private automatic branch exchange (PABX). There are fewer base stations (FSn) than mobile sets (MT) and from each base station (FSn), a connection can be set up to any mobile set (MT). The change of a mobile set (MT) into the radio cell (FBn) of another base station (FSn) is updated via the call-forwarding and follow-me facilities of the private automatic branching exchange (PABX). For this active subscriber administration by the private automatic branch exchange (PABX), the individual identifications of the mobile sets (MT) are exchanged with the respective base stations (FSn) even if no calls are being made. As a result, a cordless subscriber can be reached, especially in the case of wide-area private automatic branch exchanges (PABX), even if he is moving out of the radio cell (FBn) of one base station (FSn) and changes into the radio cell (FBn) of another one. The base stations (FSn) form a microcellular system.

14 Claims, 2 Drawing Sheets

CORDLESS TELEPHONE SYSTEM WITH A PRIVATE AUTOMATIC BRANCH EXCHANGE

BACKGROUND OF THE INVENTION

The invention relates to a cordless telephone system comprising mobile sets and base stations, the base stations being connected via subscriber lines to a private automatic branch exchange, several mobile sets being allocated to one base station and subscriber numbers of the private automatic branch exchange being allocated to the mobile sets, the subscriber numbers being convertible by the base stations into the corresponding individual identifications of the mobile sets and the base stations being set up at different locations, the radio cells of the base stations covering different areas.

Such a telephone system is described in the report of the 37th IEEE Vehicular Technology Conference, 1-3 Jun. 1987, Tampa, Fla. (US) by T. Hattori et al. on page 579-586 under the title "A new mobile communication system using autonomous radio link control with decentralized base stations". The system requires a special radio control unit (RCU) which is connected between the branch exchange and the base stations. According to Section 5.1, the radio control unit contains a switching network in order to connect the exchange line to the base station in the radio cell of which the cordless subscriber is located.

Citation GB-A 2 193 861 describes a cordless telephone system having numerous base stations, the mobile sets in each case being allocated to a home base station for accounting purposes. At this point, the locations of cordless subscribers are collected by an access control unit. The search for a called subscriber is then started from the last known location and does not necessarily lead to the correct base station over a short path. Due to the hierarchical structure of local and regional control units, the search for the subscriber can heavily load the branch exchange.

In GB-A 2 166 622, a telephone system having several base stations is described which are combined to form one unit, several mobile sets being allocated to one base station. This combined station is connected to the private automatic branch exchange via one subscriber line per mobile set. Each mobile set selects a free frequency channel from a group and can set up a connection to a base station via this channel. However, one particular frequency channel is allocated to each base station. An incoming call for a cordless subscriber is switched by the private automatic branch exchange via the corresponding subscriber line of the mobile set to a free base station. The latter converts the subscriber number into the individual identification of the mobile set and signals the incoming call. At the same time, a next free base station is marked for further calls. An exchange of the individual identification ensures that connections are only set up between base stations and mobile sets of the same telephone system.

Cordless telephones in the 900-MHz band authorized by the postal authorities can be connected via an access unit to a private automatic branch exchange and act as extension like a conventional cord-type telephone set. Each mobile set forms one unit with its base station, which can be identified by individual exchange of identifications. The connection between mobile set and base station is set up via a free radio channel which is selected from 40 possible channels. A wrong connection between mobile set and base station is prevented by the fact that due to the individual identification, each mobile set can only be connected to its associated base station.

A further cordless telephone system is described in EP-A 180 178 in which several mobile sets are allocated to one base station. The mobile sets differ by their device-specific identification and several extension mobile sets are subordinated to one main mobile set. To make outgoing calls and receive incoming calls is only possible from the main mobile set. The extension mobile sets can only receive incoming calls. This prevents outgoing calls being made by possibly unsupervised mobile sets and the subscriber being charged.

In every case, the action radius of the subscriber with a mobile set is limited to about 100-200 meters since he leaves the radio range of the base station beyond that. Mobile telephones such as are used in the B- or C-network of the German post office have a basically wider radius of action. These mobile telephones consist of a relatively large and heavy transmitting and receiving section which has to be transported by the subscriber and is much more cumbersome than the mobile set of a cordless telephone. In these cellular mobile radio networks as, for example, in accordance with EP-A 260 763, the problem of the subscriber search does not occur in the form to be solved by the invention. Locating a mobile subscriber is effected continuously via a central communication channel and is centrally administered by an exchange. There are no stationary subscriber devices such as cord-type telephones in mobile radio networks.

SUMMARY OF THE INVENTION

The invention is based on the object of increasing the radius of action of a subscriber with mobile set in the area of a private automatic branch exchange without using control unit.

The object of the present invention is achieved in a cordless telephone system with current allocation of the mobile sets to the radio cells stored in the private automatic branch exchange and transferring of an incoming call from the private automatic branch exchange to the base station in whose cell the mobile set of the call subscriber is located, by providing means for periodically exchanging the individual identification of the mobile sets with the base stations and means for utilizing a conventional facility of the private automatic branch exchange for updating the allocation.

The range of operation of private automatic branch exchanges frequently extends over an area which is far greater than the radio cell of the base station of a cordless telephone. In addition, sites which are remote from one another are also frequently connected to such a branch exchange. The cordless telephone system according to the invention is used for building up a microcellular system with base stations, the base stations acting as transmitter and receiver. The individual mobile sets are distinguished by the individual identification and the branch exchange can thus unambiguously allocate to them a subscriber number. Thus, wrong connections between mobile set and base station are also prevented in this case. The obtainability of the individual subscribers is advantageously changed by varying the number of possible radio channels per base station. In this microcellular system according to the invention, a cordless subscriber can be selectively reached with an incoming call since the base station, in whose radio cell the subscriber is located, is stored. This updating of the subscriber-base station allocation is called active subscriber administration. It is carried out without additional devices by using an already existing facility of the private automatic branch exchange. When a microcellular system can be reached instead of normal cord-type telephones by means of the subscriber numbers, no changes need to be made in the operating sequence of the branch exchange. In addition, it is determined whether a mobile set is outside the radio cell of the base station and the subscriber can therefore not be reached. In the case of an incoming call for the subscriber, a corresponding message can then be passed on and/or a voice memory device can be activated.

The object is also achieved in a cordless telephone system from which each base station transmits a periodic identification and means exist for exchanging the individual identification of a mobile set with the base station when changing the radio cell and the current allocation of the mobile sets to the radio cells of the base stations is stored in the private automatic branch exchange and an incoming call is transferred from the private automatic branch exchange to the base station in whose cell the mobile set of the called subscriber is located, by the fact that means are provided for utilizing a conventional facility of the private automatic branch exchange for updating the allocation.

Independently of actual call requests, less radio channel capacity than in the telephone system according to claim 1 is needed for this active subscriber administration of the cordless subscribers. A cordless subscriber can be booked in or out automatically or by operating a function key. The advantages of the microcellular system are retained.

For the application, it is advantageous if the call-forwarding facility exists, if an initial configuration with the allocation of each mobile set to a particular base station is stored, if means for setting up an internal connection when a mobile set changes from the radio cell of a base station to the radio cell of another base station from the other base station with transmission of the subscriber number of the transferred mobile set to the initially stored base station exist and the call-forwarding of the subscriber number of the mobile set to the new base station is stored by means of the initially stored base station. This internal connection can be set up via any subscriber line or a subscriber line especially reserved for this purpose as signalling line between the base stations and the branch exchange. A radio channel capacity corresponding to the traffic load must be reserved for this purpose. The initial configuration determines a "home base station", as it were, for each mobile set.

The internal connection does not need to be set up if the follow-me facility is present and the forwarding of the subscriber number allocated to the mobile set is stored by means of the base station into whose radio cell the cordless subscriber has moved. In principle, follow-me can be effected via any subscriber line of the new base station but will take place via the signalling line if present.

The obtainability of the cordless subscribers is improved by the fact that base stations are connected via more than one subscriber line to the private automatic branch exchange and these subscriber lines are combined to form one line group. The updating of a call-forwarding by the respective base station is then carried out to this line group. As a result, any free subscriber line of the relevant base station can be used in the case of an incoming call.

This also applies where base stations are connected via more than one subscriber line to the private automatic branch exchange and there is in the private automatic branch exchange a call redirection facility which redirects an incoming call from a busy subscriber line to another subscriber line of the same base station.

Differences in the activation of the facilities in the private automatic branch exchanges can be compensated by the fact that the base station contains an interface module for adaptation to the subscriber procedures of the facility of different private automatic branch exchanges. It is advantageous if, in the case of digital radio transmission between base station and mobile set, there is an adapter module for the mobile set to which data terminals can be connected. This adopter module is independent of the connection to the private automatic branch exchange and replaces elaborate modems. It can be built into the mobile set or plugged externally into an interface brought out for better interchangeability.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures in which like reference numerals identify like elements, and in which:

DESCRIPTION OF THE PREFERRED EMBODIMENT

Figure 1:
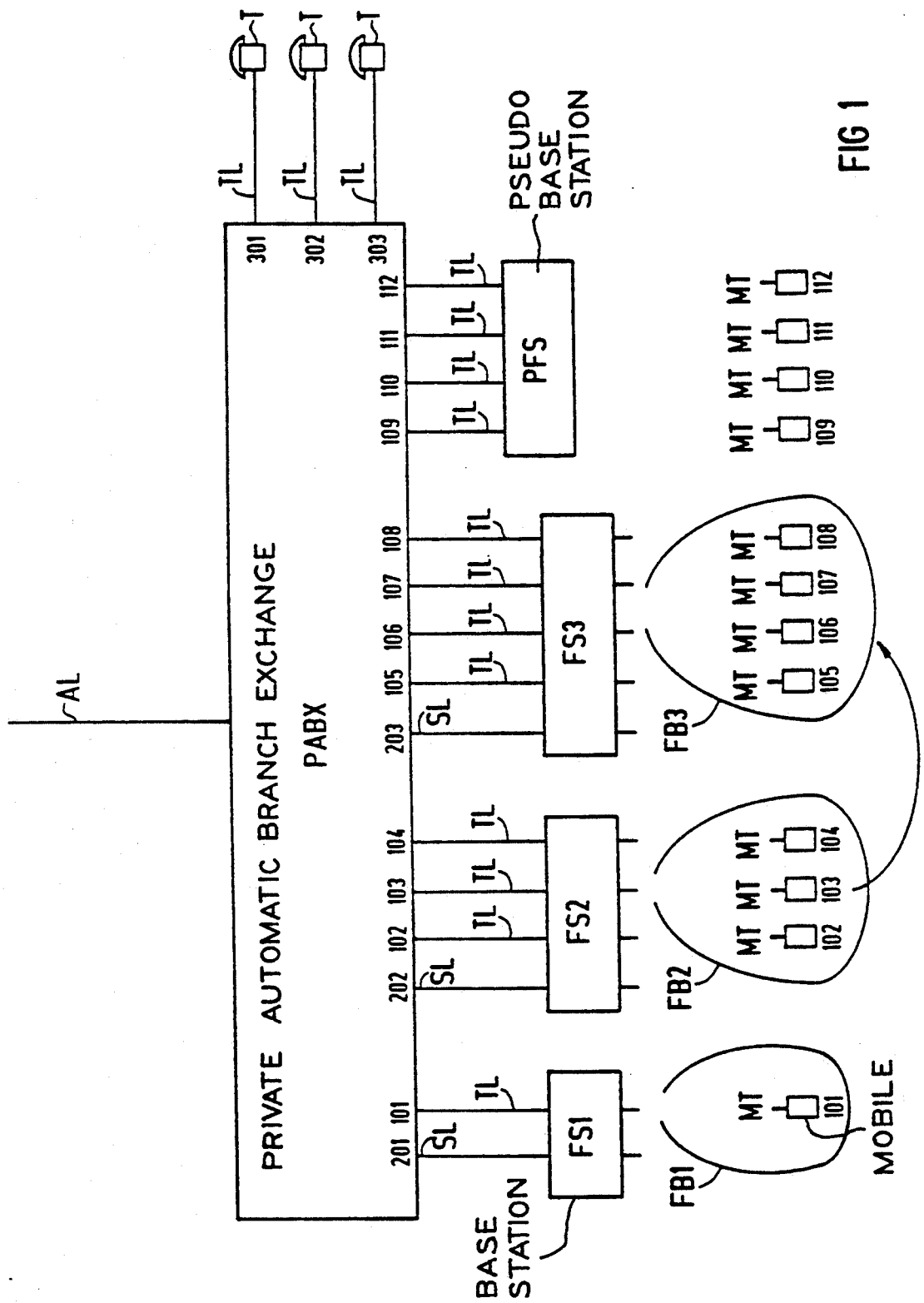
FIG. 1 shows a schematic block diagram of the preferred embodiment.

FIG. 1 shows a private automatic branch exchange PABX with analog and digital cord-type telephones T and cordless telephones which extends over a relatively wide region. A Hicom 300 system by Siemens can be used, for example, as private automatic branch exchange PABX. The facilities of this system are described in the manual A 30951-A1000-V220-1-18 of Siemens AG. The connection to the public telephone network is made by means of exchange lines AL. Base stations FSn form a microcellular system of the cordless telephones and are connected to the private automatic branch exchange PABX via subscriber lines TL like the cord-type telephones T. Mobile sets MT of the system are distinguished by an individual identification which is exchanged by radio with the base stations FSn. Microcellular systems of other branch exchanges have a different identification. Depending on the required obtainability of the cordless subscribers, one or more duplex radio channels can be available for each base station FSn. In general, the number of channels will correspond to the number of subscriber lines TL by means of which the respective base station FSn is connected to the private automatic branch exchange PABX. The cordless telephones can correspond to 900-MHz systems but 27- or 40-MHz systems may also be sufficient in smaller branch exchanges. When a cordless subscriber changes location, his mobile set MT can move into the radio cell FBn of another base station FSn.

Outgoing calls from the mobile set MT to the base station FSn are made analogously to existing cordless telephones, it being possible to set a connection up between each base station FSn and each mobile set MT. At periodic intervals the mobile sets MT send the individual identification to the base station FSn in whose radio cell FBn they are located. However, the radio path is loaded less if the base stations FSn send a periodic identification and the mobile sets MT only send an identification when they are leaving the radio cell FBn of a base station FSn. Using active subscriber administration, the current location of the mobile sets MT in the radio cells FBn of the individual base stations FSn is picked up by the exchange control of the private automatic branch exchange PABX. This makes it possible to route an incoming call directly to the base station FSn in whose radio cell FBn the called mobile set MT is currently located. The subscriber administration is carried out by utilizing the call-forwarding or follow-me facilities of the private automatic branch exchange PABX. For this purpose, each base station FSn is connected to the private automatic branch exchange PABX by a signalling line SL and a radio channel capacity corresponding to the traffic volume is reserved for updating the mobile set-base station allocation. Using the signalling line SL, the subscriber administration can also be carried out when the subscriber lines TL are busy.

To each mobile set MT a particular subscriber number must correspond as extension. If there is the same number of mobile sets MT as subscriber lines TL to the base stations FSn, the subscriber numbers of these subscriber lines TL are exactly allocated to the mobile sets MT. The allocation is shown in FIG. 1. To make better use of the capacity of the microcellular system, it is advantageous to operate more mobile sets MT than there are subscriber lines TL to the base stations FSn (subscriber numbers 109-112). If the call-forwarding facility is used, a pseudo base station PFS, which has no radio channels, must be connected to the branch exchange for this excess number of mobile sets MT. It has the task of updating the call-forwarding for the subscribers allocated to it. The number of subscriber lines TL at the pseudo base station PFS corresponds to the number of additionally possible mobile sets MT. If the follow-me facility is used, the subscriber number of any cord-type subscriber can be used. For this subscriber number, a call-forwarding to itself is then set up by the first base station FSn provided for the relevant mobile set MT.

With active subscriber administration with the call-forwarding facility, the initial allocation of the mobile sets MT to the base stations FSn and the pseudo base station PFS for each mobile set MT determines a "home base station" which carries out the updating of the call-forwarding for its allocated subscribers during the entire operation. If, for example, mobile set MT having the subscriber number 103 moves from radio cell FB2 of the second base station FS2 to radio cell FB3 of the third base station FS3, the third base station FS3 determines on the basis of the identification number or on the basis of the associated subscriber number 103 the home base station of this mobile set MT. After that, the third base station FS3 sets up an internal connection to the home base station via its signalling line SL. On the basis of the B-subscriber number 203, which comes from the group of numbers determined for the signalling lines SL, the second base station FS2 recognizes that this is the call from another base station FSn for updating the mobile set-base station allocation of a subscriber allocated to it. If only one subscriber is allocated to a base station FSn, it is known for which subscriber the call-forwarding is to be redirected to one of the subscriber numbers of the new base station FSn. If several subscribers are allocated to the new base station FSn, the number of the subscriber to be forwarded may be integrated into the call signalling under certain circumstances. It can also be transferred with the aid of the multi-frequency dialling process in the through-connected state after signalling the home base station. Via this continuously updated call redirection, an incoming call reaches a subscriber line TL of the correct base station FSn.

The follow-me facility of the private automatic branch exchange PABX can also be utilized for active subscriber administration. In this arrangement, several subscriber numbers may originally be allocated to one subscriber line TL due to activated call-forwardings. If a mobile set MT moves into the radio cell of another base station FSn, the necessary call-forwarding for this subscriber is set up or added by the other base station FSn via the signalling line SL in the private automatic branch exchange PABX. Via this continuously updated call redirection, an incoming call reaches the subscriber line TL of the correct base station FSn.

Since one or several mobile sets MT can be forwarded to one subscriber line TL, it must be ensured that only the required mobile set MT is called. In the case of a forwarded call for a mobile set MT handed over, the base station FSn uses the subscriber number of the called subscriber, usually available at digital subscriber interfaces of the private automatic branch exchange PABX, for distinguishing the calls. In the case of analog lines, the information may be forwarded in the multi-frequency process with modification of the private automatic branch exchange. If a mobile set MT is located within the radio cell FBn of its home base station, the information usually transmitted via digital subscriber interfaces indicates to this home base station that this is not a forwarded call. The mobile set MT of the called cordless subscriber therefore has the subscriber number of the busy subscriber line TL. In the case of analog lines, this is due to the fact that no subscriber number is transmitted after answering. The subscriber number is converted into the corresponding radio identification number by the base station FSn and this is used for selectively calling the mobile set MT of the required subscriber.

If the base station FSn is connected to the private automatic branch exchange PABX via several subscriber lines TL, the follow-me or call-forwarding generally occurs to a particular subscriber line TL. So that the called, forwarded subscriber can also be reached when precisely this special subscriber line TL is busy, the line group facility of the private automatic branch exchange PABX can be utilized. All subscriber lines TL of a base station FSn are then combined to form one line group and the call-forwarding is connected to this line group. In addition, the call-redirection facility can also be used for using a different subscriber line TL of the base station FSn in the busy case. When this facility is chained, all subscriber lines TL of a base station FSn can be checked for availability. If only one call redirection can be carried out, a correspondingly reduced improvement in obtainability is achieved.

If the number of the destination subscriber is not contained in the signalling to the base station FSn, for example in the case of facilities such as callback after the first call of a subscriber who is not answering or "camp-on-busy", the following variant must be provided for each cordless subscriber. A forwarding to an own analog subscriber line is initiated for the subscriber number. This station is connected to an own exchange circuit or tie line with registered subscriber number outside the system. As a destination for an incoming call, a particular extension is set up, in most cases only program-controlled, in the case of the exchange circuit/tie line. This fictitious subscriber line can generally even be the same line to which a subscriber is forwarded because a call-forwarding entered for this line is generally ignored by the private automatic branch exchange PABX if it is the destination of an already forwarded call. Due to the call-forwarding, continuously updated for this fictitious extension, the correct base station FSn is always reached. As an indication for the called subscriber in the base station FSn, the designation of the exchange circuit/tie line is signalled by the private automatic branch exchange PABX. In this case, this is the number and the name of the subscriber actually required. The latter can thus be selectively called by the base station FSn. The exchange circuit/tie line must be able to send out a ground signal so that the cordless subscriber can utilize the facilities of the private automatic branch exchange PABX.

Figure 2:
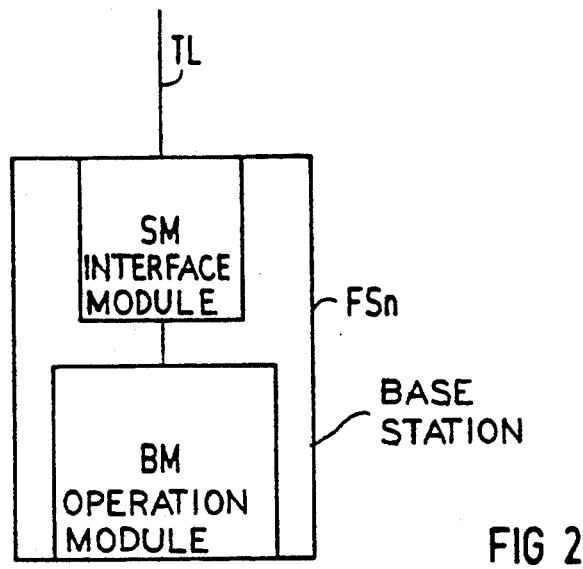
FIG. 2 shows a schematic block diagram of a base station.

As shown in FIG. 2, each base station FSn is configured with an operating module BM and an interface module SM. Different activation procedures of the facilities of different private automatic branch exchanges are adapted to the uniform configuration of the base stations FSn by the interface module SM. The interface module SM is connected via a standardized internal interface to the operating module BM of the base station FS.

Figure 3:
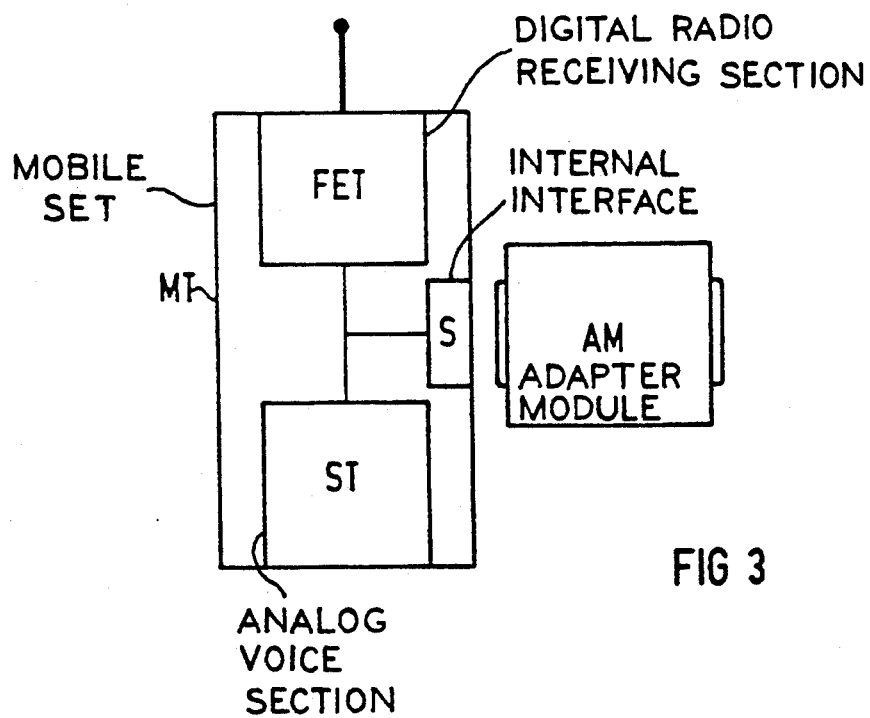
FIG. 3 shows a schematic block diagram of a mobile set.

FIG. 3 shows the configuration of a mobile set MT as used in digital radio transmission. An adapter module AM is plugged onto an internal interface S. It converts transmitted data for standardized interfaces of data terminals. The adapter module AM is connected between the digital radio receiving section FET and the analog voice section ST of the mobile set MT. Standardized interfaces of the V24, X21, X25 or $S_0$ type are available by exchanging the adapter module AM. As a result, data terminals can be operated as mobile units within the entire area of the private automatic branch exchange.

The invention is not limited to the particular details of the apparatus and method depicted and other modifications and applications are contemplated. Certain other changes may be made in the above described apparatus and method without departing from the true spirit and scope of the invention herein involved. It is tended, therefore, that the subject matter in the above depiction shall be interpreted as illustrative and not in a limiting sense.

I claim:

1. A cordless telephone system comprising a plurality of mobile sets and a plurality of base stations, the base stations being connected via subscriber lines to a private automatic branch exchange, several mobile sets of the plurality of mobile sets being allocated to one base station of the plurality of base stations and subscriber numbers of the private automatic branch exchange being allocated to the mobile sets, the subscriber numbers being convertible by the base stations into corresponding individual identifications of the mobile sets and the base stations being set up at different locations, radio cells of the base stations covering different areas and a current allocation of the mobile sets to the radio cells being stored in the private automatic branch exchange and an incoming call being transferred from the private automatic branch exchange to the base station in the radio cell of which the mobile set of the call subscribed is located, means for periodically exchanging the individual identification of the mobile sets with the base stations and means for utilizing a conventional facility of the private automatic branch exchange for updating the allocation.

2. A cordless telephone system comprising a plurality of mobile sets and a plurality of base stations, the base stations being connected via subscriber lines to a private automatic branch exchange, several mobile sets of the plurality of mobile sets being allocated to one base station of the plurality of base stations and subscriber numbers of the private automatic branch exchange being allocated to the mobile sets, the subscriber numbers being convertible by the base stations into corresponding individual identifications of the mobile sets and the base stations being at different locations, radio cells of the base stations covering different areas, each base station sending a periodic identification, the individual identification of a mobile set being exchanged with the base station during a change from one radio cell to another radio cell and current allocation of the mobile sets to the radio cells of the base stations being stored in the private automatic branch exchange and an incoming call being transferred from the private automatic branch exchange to the base station in the radio cell of which the mobile set of the call subscriber is located, a conventional facility of the private automatic branch exchange being utilized for updating the allocation.

3. The cordless telephone system as claimed in claim 1, wherein the private automatic branch exchange has a call-forwarding facility, wherein an initial configuration with the allocation of each mobile set to a particular base station is established, wherein an internal connection for transmitting the subscriber number of a handed-over mobile set to an initially determined base station is set up by another base station when a mobile set changes from the radio cell of one base station to the radio cell of another base station and wherein the call-forwarding of the subscriber number of the mobile set to the new base station is established by the initially determined base station.

4. The cordless telephone system as claimed in claim 1, wherein the private automatic branch exchange has a follow-me facility and wherein call-forwarding of the subscriber number allocated to the mobile set is established by the base station into whose radio cell the cordless subscriber has moved.

5. The cordless telephone system as claimed in claim 1, wherein base stations are connected to the private automatic branch exchange via more than one subscriber line and the subscriber lines are combined to form a line group in the private automatic branch exchange.

6. The cordless telephone system as claimed in claim 1, wherein base stations are connected to the private automatic branch exchange via more than one subscriber line and the private automatic branch exchange has a call-redirection facility which, in the case of an incoming call, redirects the incoming call from a busy subscriber line to another subscriber line of the same base station.

7. The cordless telephone system as claimed in claim 1, wherein each base station of the plurality of base stations has an interface module for adaptation to the subscriber procedures of different private automatic branch exchanges.

8. The cordless telephone system as claimed in claim 1, wherein, the case of digital radio transmission between the base station and the mobile set, the mobile set has an adapter module to which data terminals are connect.

9. The cordless telephone system as claimed in claim 2, wherein the private automatic branch exchange has a call-forwarding facility, wherein an initial configuration with the allocation of each mobile set to a particular base station is established, wherein an internal connection for transmitting the subscriber number of a handed-over mobile set to an initially determined base station is set up by another base station when a mobile set changes from the radio cell of one base station to the radio cell of another base station and wherein the call-forwarding of the subscriber number of the mobile set to the new base station is established by the initially determined base station.

10. The cordless telephone system as claimed in claim 2, wherein the private automatic branch exchange has a follow-me facility and wherein call-forwarding of the subscriber number allocated to the mobile set is established by the base station into whose radio cell the cordless subscriber has moved.

11. The cordless telephone system as claimed in claim 2, wherein base stations are connected to the private automatic branch exchange via more than one subscriber line and the subscriber lines are combined to form a line group in the private automatic branch exchange.

12. The cordless telephone system as claimed in claim 2, wherein base stations are connected to the private automatic branch exchange via more than one subscriber line and the private automatic branch exchange has a call-redirection facility which, in the case of an incoming call, redirects the incoming call from a busy subscriber line to another subscriber line of the same base station.

13. The cordless telephone system as claimed in claim 2, wherein each base station of the plurality of base stations has an interface module for adaptation to the subscriber procedures of different private automatic branch exchanges.

14. The cordless telephone system as claimed in claim 2, wherein, in the case of digital radio transmission between the base station and the mobile set, the mobile set has an adapter module to which data terminals are connected.

* * * * *